United States Patent [19]

Maurer

[11] Patent Number: 5,316,346
[45] Date of Patent: May 31, 1994

[54] ANTI-ROTATION BRACKET FOR A FLANGED CONNECTION SPACED FROM FIXED STRUCTURE

[75] Inventor: Manfred F. Maurer, Cincinnati, Ohio
[73] Assignee: General Electric Company, Cincinnati, Ohio
[21] Appl. No.: 866,719
[22] Filed: Apr. 10, 1992
[51] Int. Cl.⁵ ............................................. F16L 3/22
[52] U.S. Cl. ...................................... 285/23; 285/61; 285/187; 248/901; 248/49
[58] Field of Search .................. 285/23, 61, 64, 187; 248/901, 67.7, 70, 49

[56] References Cited

U.S. PATENT DOCUMENTS

| | | | |
|---|---|---|---|
| 2,317,598 | 4/1943 | Francois | 285/61 |
| 2,445,484 | 7/1948 | Kopperman | 285/187 |
| 3,008,735 | 11/1961 | Van Wijingaarden | 285/61 |
| 3,076,627 | 2/1963 | Huron | |
| 3,078,477 | 2/1963 | Schmid et al. | 285/61 |
| 3,815,859 | 6/1964 | Leopold, Jr. et al. | |
| 3,999,784 | 12/1976 | Kennedy, Jr. | |
| 4,068,854 | 1/1978 | Douglass, Jr. | 248/70 |
| 4,192,142 | 3/1980 | Häegele | 248/70 |
| 4,363,337 | 12/1982 | Pease | 285/61 |
| 4,384,696 | 5/1983 | Blake | 248/901 |
| 4,615,500 | 10/1986 | Layson . | |
| 5,100,291 | 3/1992 | Glover | 248/901 |
| 5,110,073 | 5/1992 | Schoenky | 248/70 |
| 5,188,170 | 2/1993 | Giberson | 248/901 |

FOREIGN PATENT DOCUMENTS

| | | | |
|---|---|---|---|
| 541381 | 8/1959 | Belgium | 285/61 |
| 1180652 | 6/1959 | France | 285/61 |

*Primary Examiner*—Eric K. Nicholson
*Attorney, Agent, or Firm*—Jerome C. Squillaro; David L. Narciso

[57] ABSTRACT

An anti-rotation bracket for restraining rotational and axial movement of an oil supply tube in an aircraft gas turbine engine during assembly and disassembly of a flanged connection between segments of the tube. The bracket includes a leg which extends about an adjacent stiffening ring of the turbine frame, a body portion having a substantially U-shaped channel opening to the leg for positioning the bracket around the oil supply tube, and a plurality of elongated holes passing through the body portion for clamping the bracket to the oil supply tube flange by the screws which attach the flanges together. The leg preferably includes spaced walls which receive a portion of the ring therebetween and provide clearance to allow for movement of the tube as a result of thermal expansion.

12 Claims, 2 Drawing Sheets

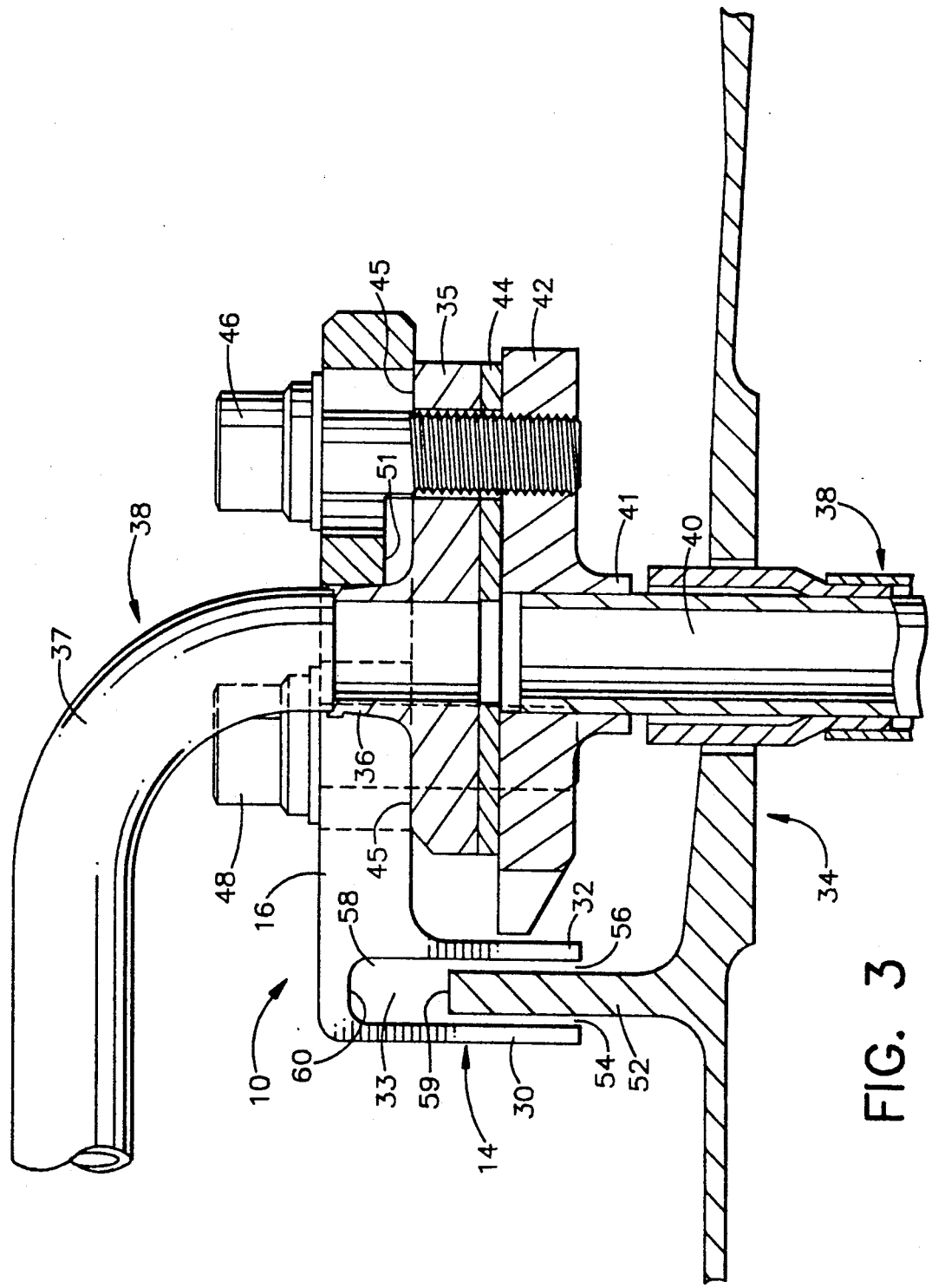

ANTI-ROTATION BRACKET FOR A FLANGED CONNECTION SPACED FROM FIXED STRUCTURE

The government has rights in this invention pursuant to Contract No. F33657-88C-2133 awarded by the Department of the Air Force.

BACKGROUND OF THE INVENTION

The present invention relates to fluid supply systems and more particularly, to fluid supply lines having flanged connections in turbine frame modules of jet engines.

In aircraft turbine and similar engines having supply lines for use in cooling and lubricating components of the engine, it is necessary to maintain the lines so that they are not pinched, twisted or ruptured, which would result in leakage of oil. Additionally, oil supply lines generally comprise many tube segments coupled together by flanges. Such flanges are brazed to the ends of the tubing and include holes so that contiguous flanges may be bolted together.

A problem which arises during assembly and disassembly of the tube segments is that excessive torquing of the flange bolts during assembly, or seizing of the bolts during disassembly, can twist the entire oil supply tube, yielding the tube and causing braze cracking at the hub attachment point between the flanges and the tube segments. The combination of braze cracking and transient vibratory response loading can result in crack initiation in the oil supply tube, leading to subsequent in-service tube failure.

A special anti-torque ratchet has been developed for assembly and disassembly of the tube sections to prevent this problem; however, such tools are expensive and inconvenient to use. Further, the number of ratchets that would be necessary in an aircraft assembly and disassembly environment would increase the expense and inconvenience, making their use even more undesirable.

Various clamps and mountings have been designed which are secured to the frame of associated equipment and are clamped to fluid lines to hold the lines in position relative to the frame and to each other. However, problems exist with such prior known clamps when utilized for an oil supply tube in the turbine frame module of a gas turbine engine. For example, the engine vibration is transmitted from the frame to the clamps to damage the oil supply tube as well as loosen the engagement between the clamps and tube. Tube vibration may also cause the brackets to become loose, and the vibration between the bracket and tube further damages the tube.

In addition, using a bracket which is mounted on the frame structure inhibits thermal expansion of the oil tube during engine operation. Typically, the oil tube and the frame module have different thermal expansion rates, causing the bracket to grow at the rate of the frame and not at the rate of the tube, thereby damaging the tube.

Furthermore, prior bracket designs do not torsionally restrain the hardware used to connect the oil supply tube flanges during assembly and disassembly of the tube segments. If a flange is not properly restrained during assembly and disassembly of the tube segments, the flange will twist, cracking the braze between the flange and the supply tube. Therefore, the need exists for a flange bracket that restrains rotational and axial movement of the oil supply tube during assembly and disassembly of the tube segments, and provides slight movement of the oil supply tube due to the differences in thermal expansion of the supply tube and the turbine frame module.

SUMMARY OF THE INVENTION

The present invention is an anti-rotation bracket for a fluid supply tube flange, preferably an oil supply tube flange, which prevents yielding of the tube due to overtorquing or unseating of seized flange bolts during assembly and disassembly of tube segments. This invention is a single piece bracket, bolted to the tube flange, which provides torsional and axial restraining of the tube. The one-piece bracket includes a body segment including a cutout portion for receiving the supply tube, and legs extending perpendicularly from one end of the body of the bracket. The legs have first and second side walls defining slots, and the legs are positioned to receive an adjacent stiffening ring on the turbine frame in the slot. The ring engages the side walls during rotational and engine axial movement.

Elongated holes are located in the bracket body which allow the desired axial positioning of the bracket on the flange. The stiffening ring extends into the channel such that there is a gap clearance on either side as well as on top of the stiffening ring. The gap clearance between the bracket and the stiffening ring allows slight movement of the tube which is necessary because of the difference in thermal expansion of the supply tube and the turbine frame.

Torsional restraining is accomplished by counteracting the excessive torque at the stiffening ring. Axial restraining is accomplished by controlling the axial position of the center line of the tube with respect to the stiffening ring.

Accordingly, it is an object of the present invention to provide an anti-rotation bracket for a fluid supply tube flange that prevents yielding of the tube due to torsional forces during assembly and disassembly of the tube flange; to provide a bracket that is an integral component of the tube; the elimination of special tools for installation and removal of the hardware; the prevention of axial movement of the oil supply tube while allowing slight movement for thermal expansion differences; and being inexpensive to manufacture and easy to assemble.

These and other objects of the present invention will be better understood by reference to the following detailed description, the accompanying drawings and the appended claims.

BRIEF DESCRIPTION OF THE DRAWINGS

FIG. 3 is a side elevation, partially in section, of the anti-rotation bracket of FIG. 1, shown mounted on an oil tube flange, also in section.

DETAILED DESCRIPTION

Figure 1:
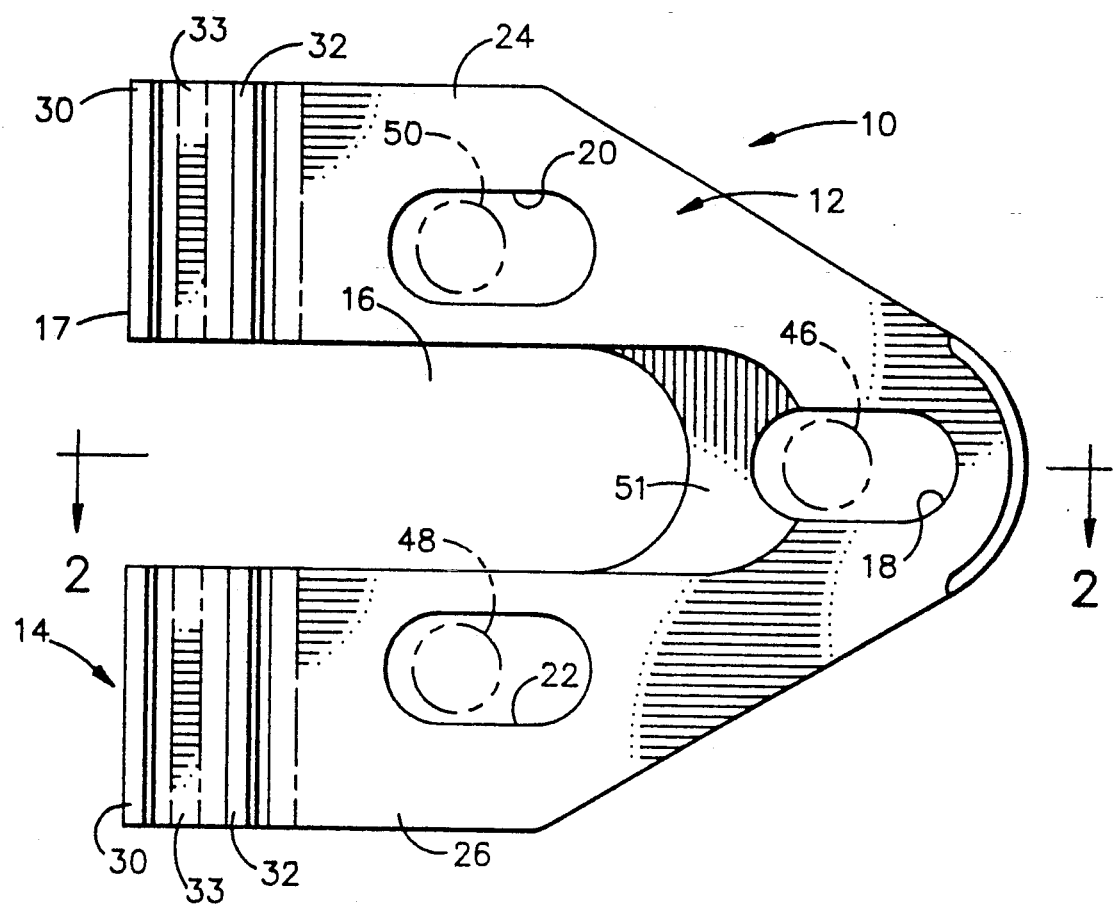
FIG. 1 is a bottom plan view of the anti-rotation bracket of the present invention.
Figure 2:
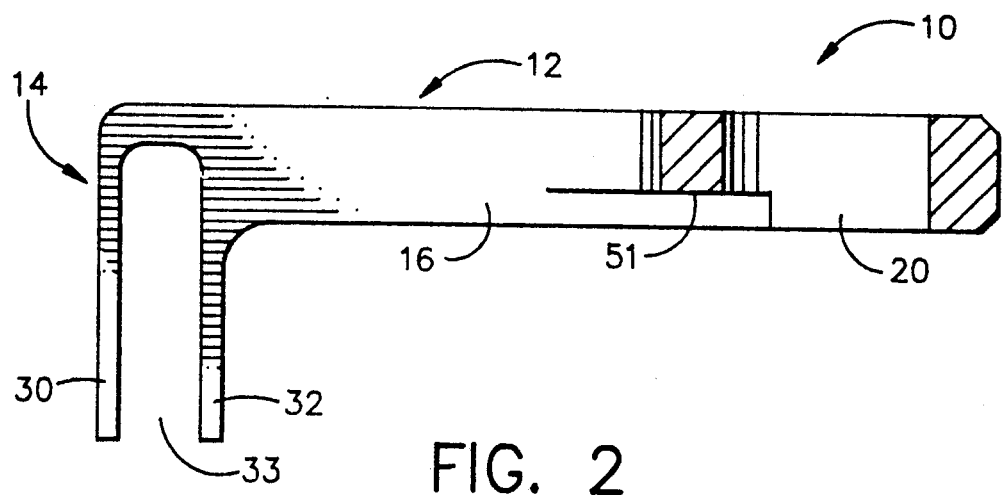
FIG. 2 is a side elevation in section of the anti-rotation bracket taken at line 2—2 of FIG. 1.

An anti-rotation bracket, generally designated 10, of the present invention is shown in FIGS. 1 and 2, and includes a body portion or plate and a leg portion 14. The body portion includes a U-shaped cutout portion or channel 16 extending longitudinally from rear edge 17 of the body portion, so that the body portion is substantially V-shaped. Slotted holes 18, 20 and 22 extend through the body portion of the nose and sides, respectively.

Channel 16 extends from edge 17 of body portion 12 thereby defining legs 24, 26 in the leg portion which extend perpendicularly from the edge. Legs 24, 26 each include vertically-extending, substantially parallel side walls 30, 32 defining a transverse channel 33 therebetween.

As can be seen in FIG. 3, the anti-rotation bracket 10 is located adjacent a frame module, generally designated 34, of an aircraft gas turbine engine and is attached to a flange 35 having a cylindrical boss 36 welded to the end of an oil supply tube segment 37 of oil supply line 38. A second oil supply tube segment 40 of line 38 terminates in a cylindrical boss 41 of a flange 42 and is welded in place. A metal seal 44 separates flanges 35 and 42 and provides a seal between the tube segments 37, 40.

As previously discussed, prior to using the bracket 10 of the present invention, the flanges 35, 42 were simply bolted together to connect the tube segments 36, 40 without means for restraining torsional or sideward forces exerted on the oil supply tube 38 during assembly and disassembly of the segments 37, 40. The bracket 10, which provides the required force restraint, is bolted to the upper surface 45 of flange 35 by cap screws 46, 48 threaded into flange 42 through slots 18, 22. A third screw 50 (see. FIG. 1) extends through slot 20 and is threaded into flange 42. The three screws (46, 48 being shown) pass through bracket 10, flange 35 and seal 44, making the bracket integral with the flanges and seal. The channel of bracket 10 receives boss 36 of flange 35. The base surface 51 of the channel 16 is contoured to abut boss 36, and segment 37 fits into channel 16. Slots 18, 20 and 22 allow the bracket to be adjusted relative to the segment 37 and flange 35 along the upper surface 45.

Channels 33 of legs 24, 26 receive a stiffening ring 52, which projects upwardly from the turbine frame module 34. Accordingly, ring 52 will engage either of side walls 30, 32 if the bracket 10 is shifted substantially from the position shown in FIG. 3. The bracket 10 therefore provides torsional restraint in response to tightening or loosening screws 46, 48, 50 by the engagement of the stiffening ring 52 and walls 30, 32. Sideward movement of the flanges 35, 42, the result of sideward forces applied to the oil supply line 38 in a direction in the plane of the drawing, is also restrained by engagement of the side walls 30, 32 and the stiffening ring 52. Restraint of the line 38 along the axis of segments 37, 40 is accomplished by controlling the axial position of the centerline of the oil line 38 with respect to the stiffening ring.

The stiffening ring 52 extends into the channel 33 of the leg portions 24, 26 such that there are slight gap clearances 54 and 56 between the side walls 30, 32 of the legs and the stiffening ring. The stiffening ring 52 does not extend the entire depth of the channel 33 so that there is a space 58 between the top 59 of the stiffening ring and the base 60 of the channel. These spaces 54, 56, 58 around the stiffening ring 52 provide for freedom of motion sidewardly (engine axially) and vertically (engine radially), which is necessary for slight movement of the line 38 due to thermal expansion differences of the line 38 and the turbine frame 34. The bracket 10 performs the required rotational and axial restraining, but since the bracket is not rigidly attached to the frame, the engagement of leg portion 14 and ring 52 allow the necessary thermal expansion movement of the oil line 38.

The proceeding description has been presented with reference to a presently preferred embodiment to the invention shown in the drawings. Workers skilled in the art and technology to which this invention pertains will appreciate that alterations and changes in the described structure can be practiced without departing from the spirit, principles and scope of this invention.

What is claimed is:

1. In a fluid supply tube of a type having first and second segments terminating in first and second flanges, respectively, and means for connecting said flanges together, an anti-rotation bracket comprising:
   means for attachment to said first flange;
   means for engaging an adjacent fixed structure, said engaging means being sidewardly and vertically spaced from said fixed structure so as to allow thermal expansion of said fluid supply tube relative to said fixed structure while restraining rotational and sideward movement of said fluid supply tube during assembly and disassembly of said first and second flanges.

2. In a fluid supply tube of a type having first and second segments terminating in first and second flanges, respectively, and means for connecting said flanges together, an anti-rotation bracket comprising:
   means for attachment to said first flange;
   means for engaging an adjacent fixed structure, said engaging means being sidewardly and vertically spaced from said fixed structure so as to allow thermal expansion of said fluid supply tube relative to said fixed structure while restraining rotational and sideward movement of said fluid supply tube during assembly and disassembly of said first and second flanges;
   wherein said engaging means includes a channel shaped to receive an adjacent stiffening ring.

3. The bracket of claim 2 wherein said attachment means also clamps said flanges together.

4. The bracket of claim 3 wherein said attachment means includes screws, and said bracket includes a body receiving said screws therethrough, said screws threading into said second flange such that said screws clamp said body to said first flange and said first flange to said second flange.

5. The bracket of claim 4 wherein said body includes first and second legs spaced to receive said tube therethrough, said legs terminating in said engaging means.

6. The bracket of claim 5 wherein said engaging means includes first and second spaced side walls shaped to form said channel.

7. A bracket for restraining rotational and axial movement of a fluid supply tube during assembly and disassembly of a flanged connection thereon within a turbine frame module, said module including a stiffening ring adjacent to said connection; the bracket comprising:
   a leg for restraining rotational and axial movement of said fluid supply tube relative to said stiffening ring, said leg being axially and radially spaced from said stiffening ring; and
   a plate extending perpendicularly from said leg, said plate having a substantially U-shaped channel opening to said leg for positioning said bracket around said supply tube; and
   a plurality of elongated holes passing through said plate for receiving means for fastening said bracket to said supply tube flange.

8. A bracket for restraining rotational and axial movement of a fluid supply tube during assembly and disassembly of a flanged connection thereon within a turbine frame module, said module including a stiffening ring adjacent to said connection; the bracket comprising:
- a leg for restraining rotational and axial movement of said fluid supply tube relative to said stiffening ring; and
- a plate extending perpendicularly from said leg, said plate having a substantially U-shaped channel opening to said leg for positioning said bracket around said supply tube; and
- a plurality of elongated holes passing through said plate for receiving means for fastening said bracket to said supply tube flange;

wherein said leg comprises first and second side walls defining a channel therebetween for receiving said stiffening ring.

9. The bracket of claim 8 wherein said first and second side walls restrain rotational movement of said supply tube by engaging said stiffening ring.

10. The bracket of claim 9 wherein said first and second side walls substantially restrain axial movement of said supply tube.

11. The bracket of claim 9 wherein said side walls are spaced to provide clearance about said stiffening ring.

12. The bracket of claim 11 wherein said clearance permit movement of said tube resulting from thermal expansion thereof.

* * * * *